(12) United States Patent
Noh et al.

(10) Patent No.: US 8,170,410 B2
(45) Date of Patent: May 1, 2012

(54) IMAGING APPARATUS

(75) Inventors: Seung-tack Noh, Seoul (KR); Tae-hun Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/008,969

(22) Filed: Jan. 19, 2011

(65) Prior Publication Data

US 2011/0194849 A1 Aug. 11, 2011

(30) Foreign Application Priority Data

Feb. 11, 2010 (KR) ........................ 10-2010-0012898

(51) Int. Cl.
*G03B 15/03* (2006.01)

(52) U.S. Cl. ....................................... 396/177; 396/178

(58) Field of Classification Search .................. 396/175, 396/177–178; 348/370–371
See application file for complete search history.

(56) References Cited

U.S. PATENT DOCUMENTS 3,589,043 A * 6/1971 Klein ............................. 40/387
4,992,810 A * 2/1991 Schappler ..................... 396/177
5,361,822 A * 11/1994 Nijs ............................... 160/321
5,652,920 A * 7/1997 Kaihara et al. ................ 396/177
6,925,254 B2 * 8/2005 Kato et al. ..................... 396/177
7,013,083 B2 * 3/2006 Yamane ........................ 396/177
2002/0122666 A1 * 9/2002 Miyazaki et al. ............. 396/178
2005/0200745 A1 * 9/2005 Lee ............................... 348/371
2007/0177863 A1 * 8/2007 Ishikawa et al. .............. 396/177

* cited by examiner

*Primary Examiner* — Christopher Mahoney
(74) *Attorney, Agent, or Firm* — Drinker Biddle & Reath LLP

(57) ABSTRACT

An imaging apparatus including a strobo assembly capable of controlling a light emitting angle of a strobo. The imaging apparatus includes a case and a strobo assembly mated to the case and that revolves with respect to the case. The strobo assembly includes a light source that emits light; a strobo housing that accommodates the light source; a bush embedded in the strobo housing and that provides a revolution shaft of the strobo assembly; and an elastic member accommodated in the bush and that provides a predetermined elastic force so that the strobo assembly revolves with respect to the case.

16 Claims, 10 Drawing Sheets

IMAGING APPARATUS

CROSS-REFERENCE TO RELATED PATENT APPLICATION

This application claims the priority benefit of Korean Patent Application No. 10-2010-0012898, filed on Feb. 11, 2010, in the Korean Intellectual Property Office, the entire disclosure of which is incorporated herein by reference.

BACKGROUND

1. Field of the Invention

Embodiments relate to an imaging apparatus, and more particularly, to an imaging apparatus including a strobo assembly capable of controlling a light emitting angle of a strobo.

2. Description of the Related Art

Recently, digital signal lens reflex (DSLR) cameras that provide high quality photographs and generate digital images have been widely popularized. In this regard, a "single lens reflex" refers to a method of transmitting light from a subject to a viewfinder through a single lens or transmitting the light to a sensor that photographs an image. Frequently used popular-type digital cameras are twin lens reflex (TLR) cameras. These popular-type digital cameras are able to take a picture while checking an image transmitted to a sensor through a display unit, but a subject image transmitted to the sensor is different from that seen from a viewfinder.

A conventional DSLR camera is fabricated having a mirror which revolves within a predetermined angular range on an optical axis of a lens with respect to a shaft. Normally, object light obtained by the lens unit is reflected by the mirror, and a subject image is formed on a focus plate. Thus, a photographer can check the subject image formed on the focus plate via a penta prism and a view finder. In this case, if a shutter-release signal is inputted, the mirror revolves within the predetermined angular range with respect to the shaft and moves upward in order to retreat from the optical axis of the lens unit. When a shutter is open under the control of a shutter driving circuit, the subject image is formed on an imaging device.

Such conventional DSLR cameras may further include a strobo which is a strong light source that emits light simultaneously with a shutter operation, in order to compensate for a deficiency of light while a photographing operation is being performed. The strobo, which is an equipment that illuminates a photographing scene by generating a spontaneous flash, uses light generated by an electrical stimulus caused by a spontaneous flow of a high-voltage direct current into a discharge pipe filled with a xenon (Xe) gas or the like. A photographing operation is performed with a synchronization of the strobo with the camera, thereby obtaining uniform brightness and light quality. Small strobos are highly portable and can be used to photograph a fast-moving object even in dark places.

SUMMARY

Embodiments include an imaging apparatus including a strobo assembly capable of controlling a light emitting angle of a strobo while implementing a simpler and smaller structure.

According to an embodiment, an imaging apparatus includes a case, and a strobo assembly mated to the case and that revolves with respect to the case. The strobo assembly includes a light source that emits light, a strobo housing that accommodates the light source, a bush embedded in the strobo housing and that provides a revolution shaft of the strobo assembly; and an elastic member accommodated in the bush and that provides a predetermined elastic force so that the strobo assembly revolves with respect to the case.

The strobo housing may have a shape approximately corresponding to a "U", and the bush and the elastic member may be inserted into one end portion of the shape approximately corresponding to the "U".

A protrusion portion may be formed on the one end portion of the strobo housing, and one end portion of the elastic member may be caught by the protrusion portion.

The elastic member may be a coil spring having one end portion that protrudes and forms a hooking portion.

The hooking portion may be hooked by the protrusion portion.

A shaft may be inserted into one end portion of the bush, and a shaft holder may be inserted into an end portion of the shaft that protrudes toward another end portion of the bush.

The bush and the elastic member accommodated in the bush may be inserted into the case and the strobo housing.

The imaging apparatus may further include a stopper formed in one end portion of the elastic member, and a detection member on a flexible printed circuit board (FPCB) assembly that is mated with an the inside of the case.

The stopper and the detection member may be formed to contact to each other.

When the stopper and the detection member contact each other, light emitting of the light source may be restricted.

When the stopper and the detection member are separated from each other, the light source may be allowed to emit light.

A revolution angle of the strobo assembly with respect to the case may determine whether the stopper and the detection member contact each other.

The stopper and the detection member may contact each other when at least a portion of the strobo assembly is positioned inside the case.

The stopper and the detection member may be separated from each other when at least a portion of the strobo assembly is positioned outside the case.

A space between the stopper and the detection member may be adjustable.

The bush and the elastic member may be intergrally formed.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments will be described in detail with reference to the appended drawings.

Figure 1:
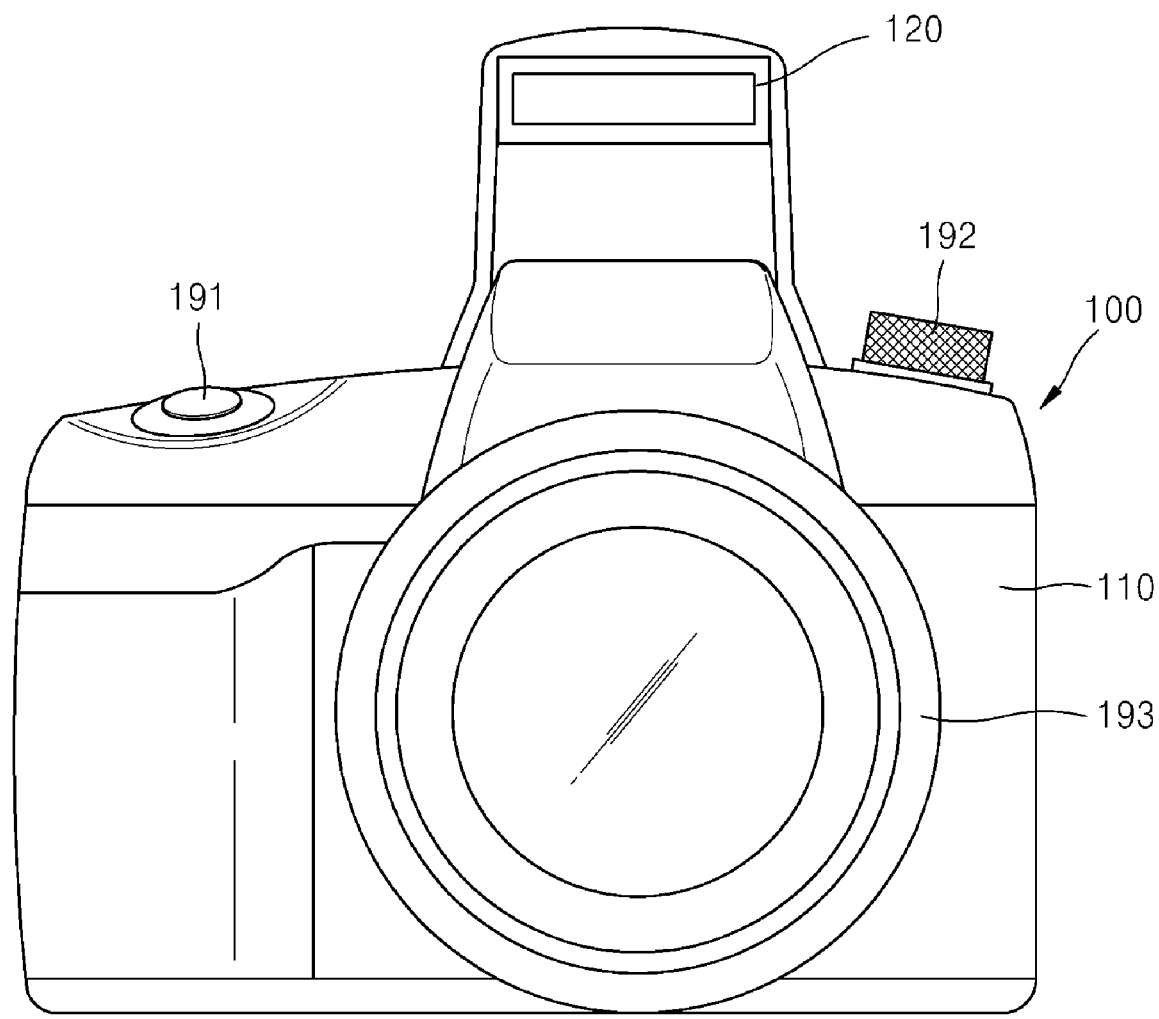
FIG. 1 is a front view of an imaging apparatus including a strobo assembly according to an embodiment.

FIG. 1 is a front view of an imaging apparatus 100 including a strobo assembly according to an embodiment.

Referring to FIG. 1, a shutter-release button 191, a mode dial 192, and a lens unit 193 can be installed on a front side of a case 110 that forms an exterior of the imaging apparatus 100 of the present embodiment.

The shutter-release button 191 of the imaging apparatus 100 can operate so as to expose an image-obtaining element (not shown) to light for a predetermined period of time, and can operate along with an aperture (not shown) to appropriately expose a subject so as to record an image of the subject onto the image-obtaining element. The image-obtaining element can be, for example, a charge-coupled device (CCD) or a complementary metal oxide semiconductor (CMOS).

The shutter-release button 191 can be used to generate first and second image capturing signals. When the first image capturing signal is inputted as, for example, a half-shutter signal, the imaging apparatus 100 can be focused and can adjust a light intensity. When the imaging apparatus 100 is focused and adjusts the light intensity according to the input of the first image capturing signal, the second image capturing signal can be inputted as, for example, a full shutter signal, and can capture an image.

The mode dial 192 can be pressed to select a photographing mode. The mode dial 192 of the imaging apparatus 100 can support an auto (or an auto photographing) mode, a scene mode, an effect mode, an A/S/M mode, etc. The auto mode can be used to minimize user's setup requirements and rapidly and conveniently photograph an image according to a particular purpose or use. The scene mode can be used to simply and optimally set a camera according to photographing conditions or conditions of a subject. The effect mode can be used to give a special effect to image photographing, such as continuous photographing, scene photographing, etc. The A/S/M mode can be used to manually set a variety of functions including an aperture and a shutter speed to photograph an image. However, the aforementioned modes are not intended to be limiting and other modes may be selected by, for example, the mode dial 192.

The lens assembly 193 can receive light from an external light source to process the images.

The strobo assembly 120 can generate instant light to illuminate a photographing scene. The strobo assembly 120 is generally installed on the upper side of the case 110 and can be opened and closed with respect to the case 110. The strobo assembly 120 is further described in more detail below.

Figure 2:
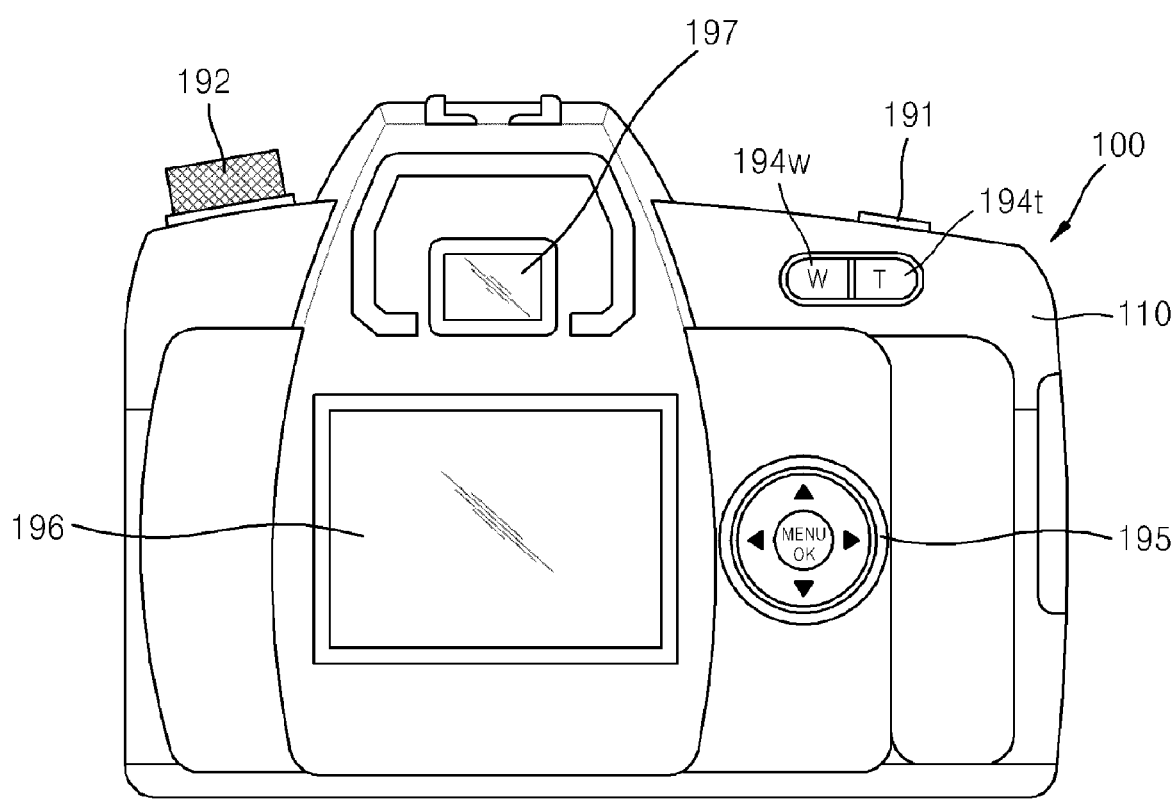
FIG. 2 is a rear view of an imaging apparatus including a strobo assembly according to an embodiment.

FIG. 2 is a rear view of the imaging apparatus 100 including a strobo assembly according to an embodiment.

Referring to FIG. 2, a viewfinder 197, a wide angle-zoom button 119w, a telephoto-zoom button 194t, a function button 195, and a display unit 196 can be installed on a rear side of the imaging apparatus 100.

The viewfinder 197 of the imaging apparatus 100 can be a small window through which a subject to be photographed is viewed and a composition thereof is set.

The wide angle-zoom button 119w and the telephoto-zoom button 194t can be respectively pressed to widen or narrow a viewing angle. In particular, the wide angle-zoom button 119w or the telephoto-zoom button 194t may be pressed to change the size of a selected exposed area. When the wide angle zoom-button 119w is pressed, the size of the selected exposed area may be increased. When the telephoto-zoom button 194t is pressed, the size of the selected exposed area may be decreased.

The function button 195 can include up, down, left, right, and MENU/OK buttons, i.e., a total of five buttons. The function button 195 can be pressed to navigate through various menus related to operations of the imaging apparatus 100. The up, down, left, right, and MENU/OK buttons may be used as shortcut keys, and the functions of the function button 195 may vary according to, for example, particular manufacturers or a particular set of functions.

The strobo assembly 120 of the imaging apparatus 100 according to an embodiment is described below in more detail.

Figure 3:
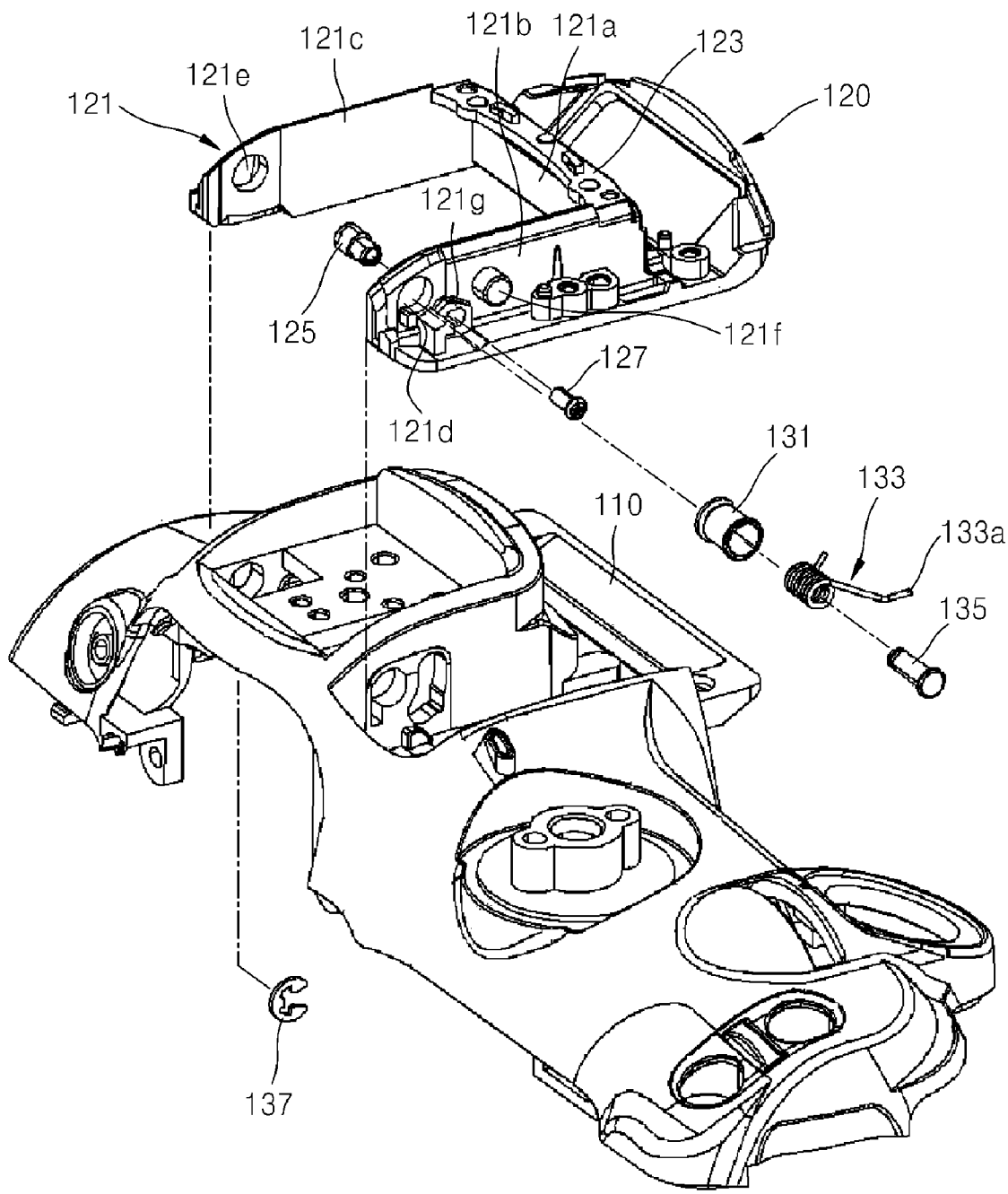
FIG. 3 is an exploded perspective view of a strobo assembly of an imaging apparatus according to an embodiment.

FIG. 3 is an exploded perspective view of the strobo assembly 120 of an imaging apparatus according to an embodiment.

Referring to FIG. 3, the strobe assembly 120 of the imaging apparatus 100 of the present embodiment can include a strobo housing 121, a light source 123, a stopper 125, a screw 127, a bush 131, an elastic member 133, a shaft 135, and a shaft holder 137. The strobo assembly 120 may be able to revolve with respect to the case 110.

In a conventional imaging apparatus, a module (for example, an elastic member, etc) for controlling revolution of a strobe assembly with respect to a case is generally combined with an exterior side of the strobe assembly. However, such a conventional structure needs space for installing additional parts to the exterior side of the strobe assembly, which makes it difficult to provide a small and lightweight imaging apparatus. Further, when the strobe assembly is opened, related parts are externally exposed and visible due to the conventional structure, which may negatively affect the outer appearance of the imaging apparatus. The conventional imaging apparatus generally includes two modules for controlling revolution of the strobe assembly in left and right sides of the strobe assembly, which are not favorable for providing a small and lightweight imaging apparatus.

In order to address the above problems, the strobo assembly 120 of the imaging apparatus 100 of the present embodiment can include parts for controlling revolution of the strobe assembly 120 with respect to the case 110 in a left side or right side thereof.

The strobo housing 121 can constitute the exterior of the strobo assembly 120 and can include the light source 123 and parts for operating the light source 123.

The strobo housing 121 can be in a rectangular shape having one side open, i.e. in a shape approximately corresponding to the letter "U", and can be divided by three regions 121a, 121b, and 121c. The light source 123 can be disposed in the first region 121a or can be disposed in the middle of the "U" shape. A second through hole 121d and a third through hole 121e can be respectively formed in the second region 121b and the third region 121c or can be disposed in both sides of the "U" shape. A predetermined structure can be inserted into the second through hole 121d or the third through hole 121e, so that the strobo housing 121 can be combined with the case 110.

A protrusion portion 121f can be formed on the second region 121b of the strobo housing 121, and an elastic member 133 (described below) can be caught by the protrusion portion 121f. A first through hole 121g can be further formed in one side of the protrusion portion 121f. A stopper 125 and a screw 127 (described below) can be inserted into the first through hole 121g.

The light source 123 can be included in the strobo housing 121. The light source 123 can use a discharge pipe, such as a xenon lamp, to emit a flash of strong light that can light a subject.

The stopper 125 can be inserted into the first through hole 121g formed in the second region 121b of the strobo housing 121. The screw 127 can be combined with one end of the stopper 125 so that the stopper 125 does not escape from the strobo housing 121. The stopper 125 can be used to restrict a revolution angle of the strobo assembly 120. Thus, when the strobo assembly 120 is opened to a predetermined angle, the stopper 125 can prevent the strobo assembly 120 from further revolving. An operating mechanism of the stopper 125 is described in more detail below.

The bush 131 can have a hollow cylindrical shape. The bush 131 can be inserted into the second through hole 121d formed in the second region 121b of the strobo housing 121. Thus, the bush 131 can function as a revolution shaft of the strobo assembly 120. The elastic member 133 can be accommodated inside the bush 131. The elastic member 133 can provide a predetermined revolution force so that the strobo assembly 120 is revolvably opened and closed. A general coil spring may be used as the elastic member 133. One end portion of the elastic member 133 may not be coiled but can protrude to some degree and may form a hooking portion 133a. The hooking portion 133a can be hooked by the protrusion portion 121f formed in the second region 121b of the strobo housing 121.

The shaft 135 can be inserted into one end portion of the bush 131 and the shaft holder 137 can be inserted into an end portion of the shaft 135 protruding toward another end portion of the bush 131. Thus, the bush 131 and the elastic member 133 cannot escape from the strobo housing 121.

The bush 131 and the elastic member 133 can be inserted into the second through hole 121d, and thus the elements used to revolve the strobo assembly 120 can be accommodated in the strobo housing 121 of the imaging apparatus 100.

A method of combining the strobo assembly 120 of the imaging apparatus 100 is described in detail below.

FIGS. 4 through 8 are views for sequentially explaining a method of combining the strobo assembly 120 of FIG. 3.

Figure 4:
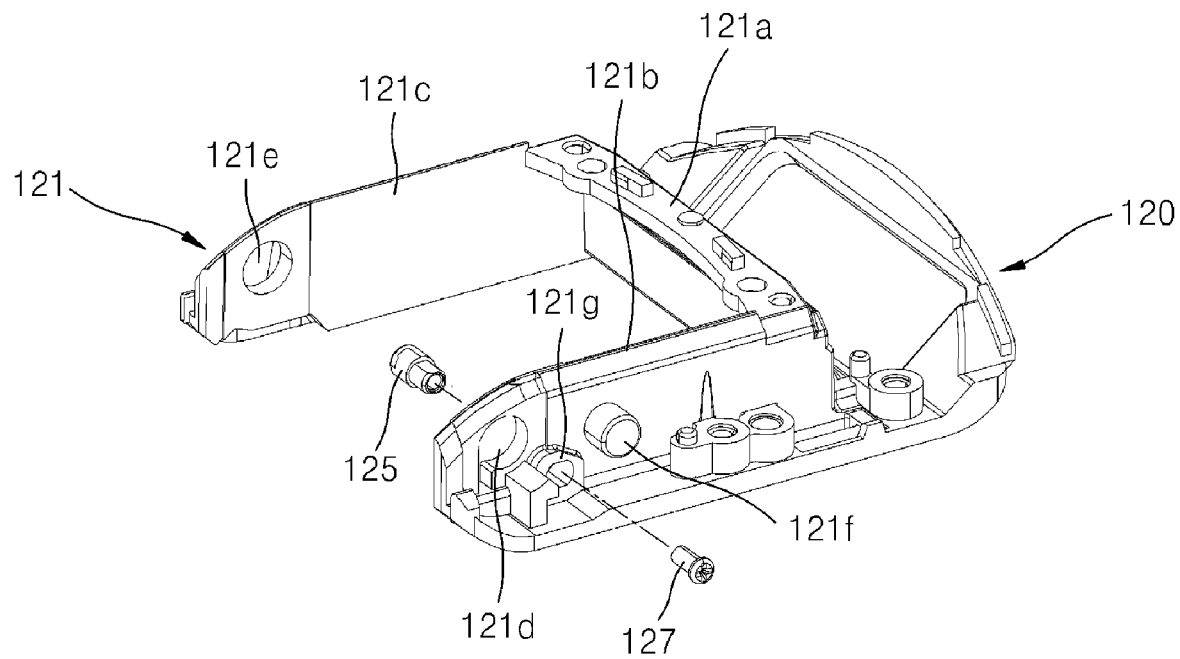
FIG. 4 is an exploded perspective view of a strobo housing of a strobo assembly according to an embodiment.

Referring to FIG. 4, the stopper 125 can be inserted into the first through hole 121g formed in the second region 121b of the strobo housing 121. The screw 127 can be coupled to one end portion of the stopper 125 so that the stopper 125 does not escape from the strobo housing 121.

Figure 5:
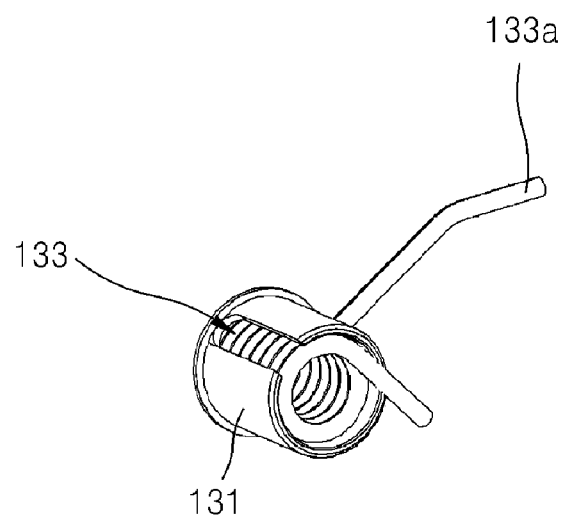
FIG. 5 is a perspective view of an elastic member and a bush of a strobo assembly according to an embodiment.

Referring to FIG. 5, the elastic member 133 can be inserted into the bush 131. The bush 131 can have a hollow cylindrical shape, and the elastic member 133 can be inserted into an inner space thereof.

Figure 6:
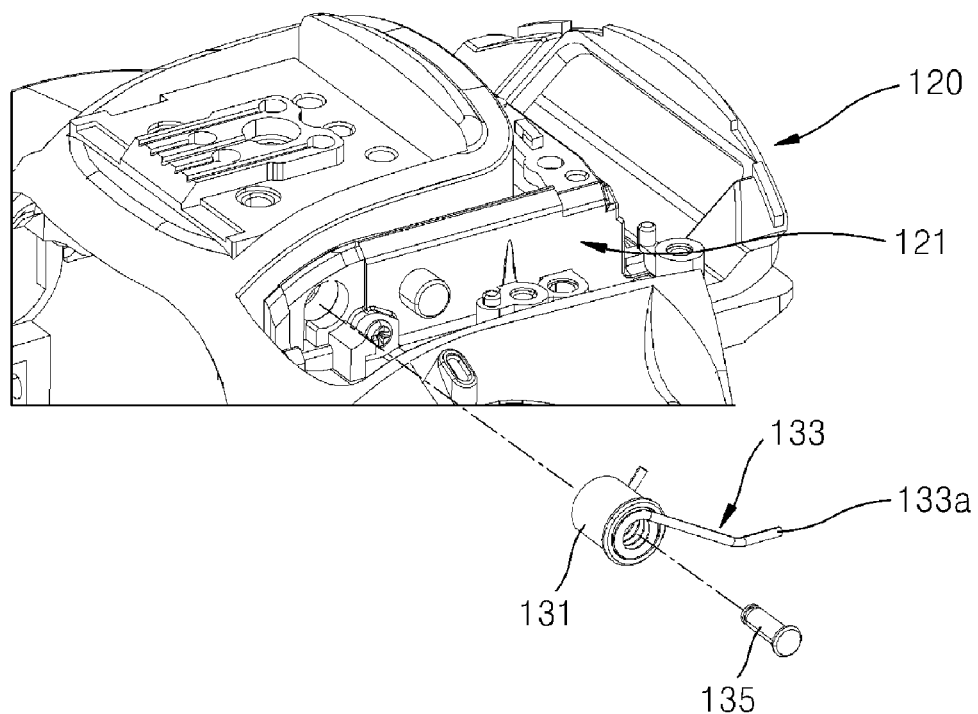
FIG. 6 is a partial exploded perspective view of a strobo housing of a strobo assembly according to an embodiment.

Referring to FIG. 6, the strobo housing 121 can be disposed on the case 110, and an assembly comprising the bush 131 and the elastic member 133 shown in FIG. 5 can be inserted into the second through hole 121d formed in the second region 121b of the strobo housing 121. A through hole (not shown) that corresponds to the second through hole 121d can also be formed in the case 110. The assembly comprising the bush 131 and the elastic member 133 can be inserted into the strobo housing 121 and the case 110 so that the strobo housing 121 and the case 110 can be combined with each other.

Figure 7:
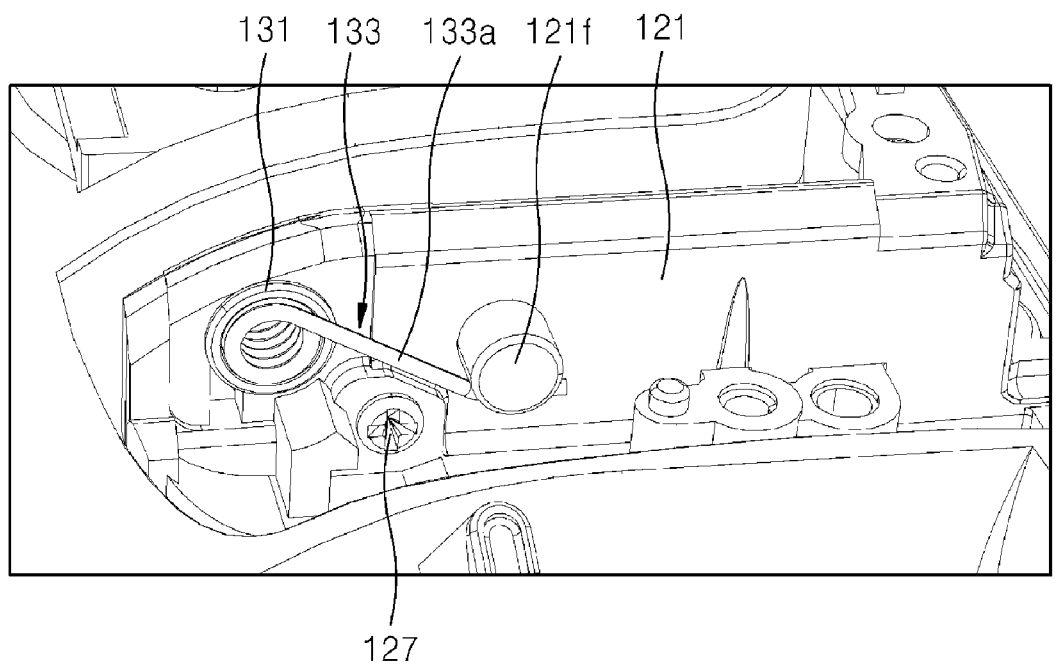
FIG. 7 is a partial perspective view of a strobo housing of a strobo assembly according to an embodiment.

Referring to FIG. 7, the hooking portion 133a of the elastic member 133 can be hooked by the protrusion portion 121f of the strobo housing 121.

Figure 8:
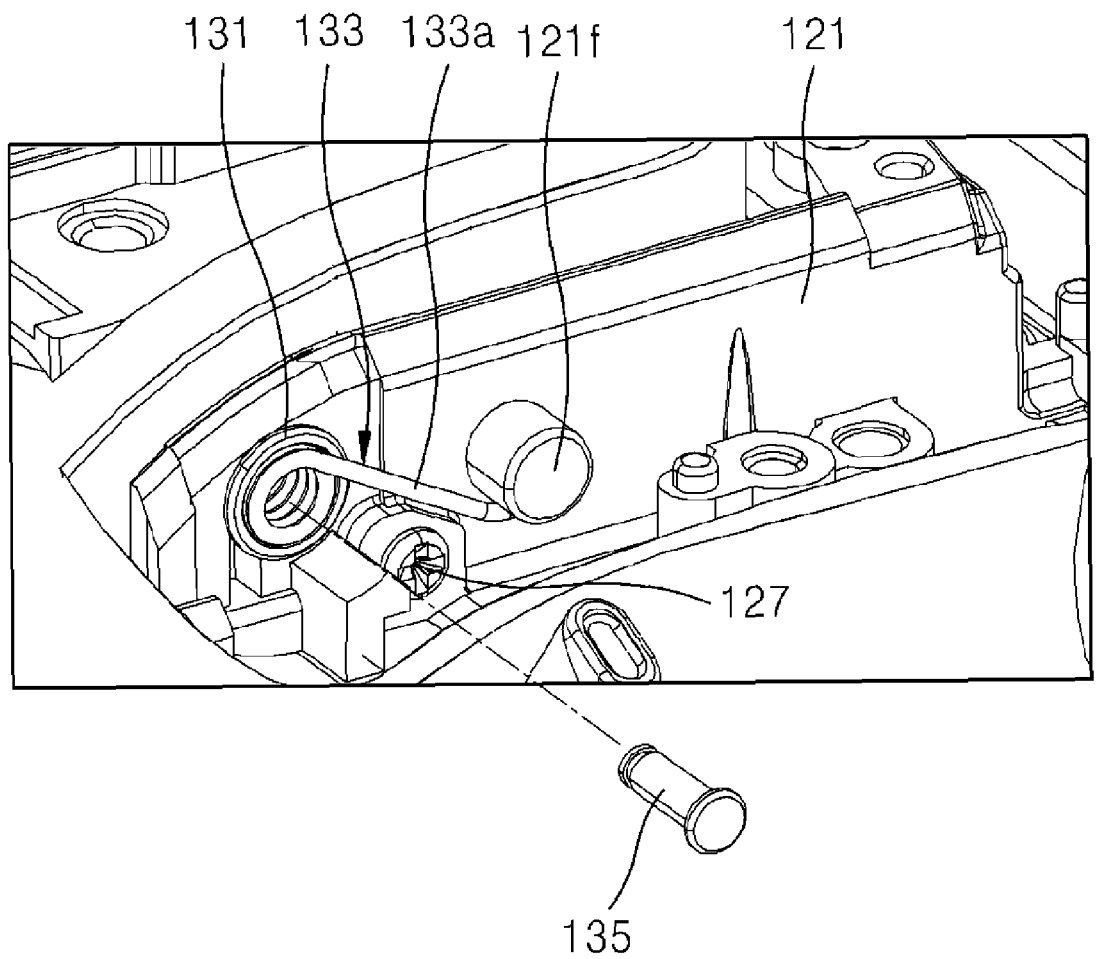
FIG. 8 is a partial perspective view of a strobo housing of a strobo assembly according to an embodiment.

Referring to FIG. 8, the shaft 135 can be inserted into one end portion of the bush 131 so that the assembly of the bush 131 and the elastic member 133 cannot escape from the strobo housing 121. The shaft holder 137 (of FIG. 3) can be inserted into an end portion of the shaft 135 protruding toward another end portion of the bush 131.

Figure 9:
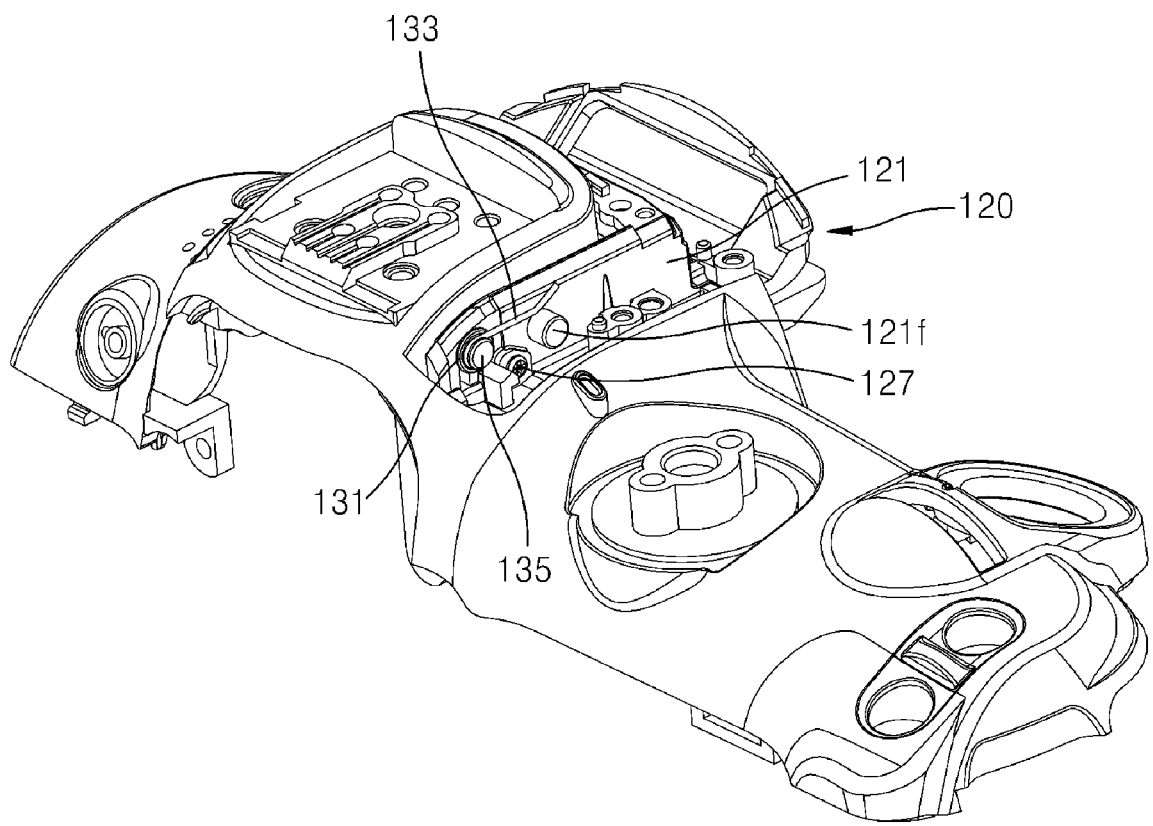
FIG. 9 is a perspective view of the strobo assembly of FIG. 3 in a closed position according to an embodiment.

The strobo assembly 120 that has been combined using the above processes is illustrated in FIG. 9.

As described above, parts used to control revolution of the strobo assembly 120 with respect to the case 110, for example, the assembly comprising the bush 131 and the elastic member 133, can be embedded in the strobo housing 121 and can be included in one side of the strobo assembly 120, thereby providing a smaller and more lightweight imaging apparatus 100. Further, the stopper 125 can be included in one side of the strobo assembly 120, which makes the structure simpler. Also, the stopper 125 may not be externally exposed, which improves the appearance of the imaging apparatus 100. Furthermore, even when the strobo assembly 120 is opened, a module for controlling revolution of the strobo assembly 120 may not be externally exposed, thereby improving the appearance of the imaging apparatus 100.

A method of operating the imaging apparatus 100 manufactured using the above method is described below.

If a close signal of a strobo is inputted, as shown in FIG. 9, the elastic member 133 can provide a driving force in an opposite direction to which the strobo assembly 120 is opened, and the strobo assembly 120 can be closed according to the driving force. For example, the elastic member 133 can provide a revolving force in an opposite direction to which the strobo assembly 120 is opened, and the strobo assembly 120 can be closed according to the revolving force.

Figure 10:
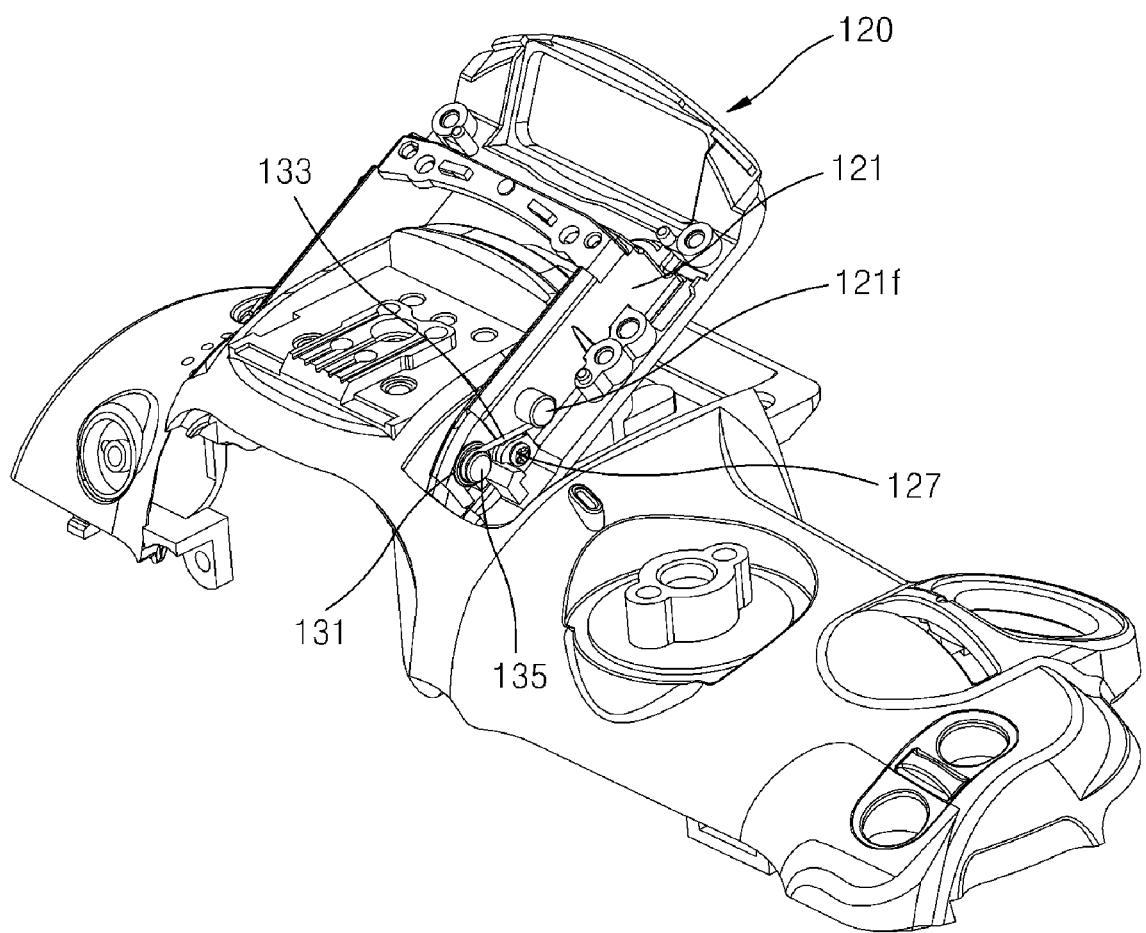
FIG. 10 is a perspective view of the strobo assembly of FIG. 3 in an open position according to an embodiment.

If a pop-up signal of the strobo is inputted, as shown in FIG. 10, the strobo assembly 120 can be unlocked, and strobo assembly 120 can be opened according to a predetermined driving force provided by the elastic member 133. For example, the strobo assembly 120 can be unlocked, and strobo assembly 120 can be opened according to a predetermined revolving force provided by the elastic member 133. If the strobo assembly 120 is opened, a revolving angle may be controlled by the stopper 125.

A structure of the imaging apparatus related to restricting a revolving angle of a strobo assembly is described in detail below.

Figure 11:
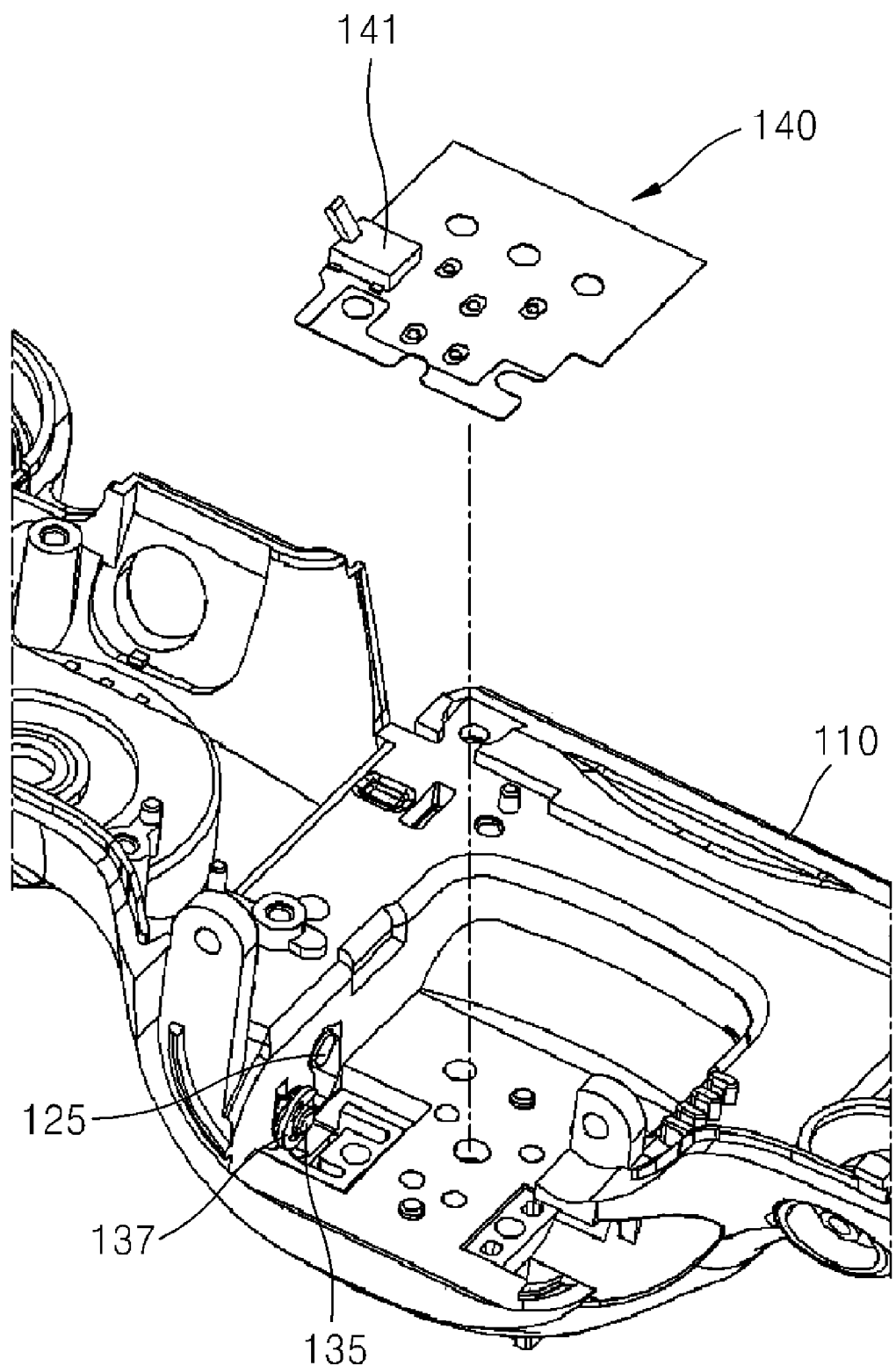
FIG. 11 is a partial rear perspective view of the imaging apparatus of FIG. 3 according to an embodiment.

FIG. 11 is a rear perspective view of the imaging apparatus 100 of FIG. 3 according to an embodiment.

Referring to FIG. 11, the imaging apparatus 100 may further include a flexible printed circuit board (FPCB) assembly 140 in which a detection member 141 may be disposed.

The conventional imaging apparatus does not have a structure used to recognize or control a light emitting signal of a strobo assembly. The conventional imaging apparatus also needs a complicated mechanism structure to control light emitting of the strobo assembly. To address these problems, the imaging apparatus 100 can include the detection member 141 capable of contacting the stopper 125, thereby recognizing a strobo light emitting signal without additional parts, which simplifies the structure necessary to control light emitting of the strobo assembly and accordingly improves the assembly and production of the imaging apparatus 100.

An imaging element, a CPU for generally controlling an operation of a digital image processing apparatus, a digital signal processor, and the like can be attached to the FPCB assembly 140. The detection member 141 can be formed in one side of the FPCB assembly 140. The detection member 141 can also contact the stopper 125.

The detection member 141 can be surface mounted on the FPCB assembly 140. Then, the FPCB assembly 140 can be combined with an inner surface of the case 110 using, for example, a screw.

Figure 12:
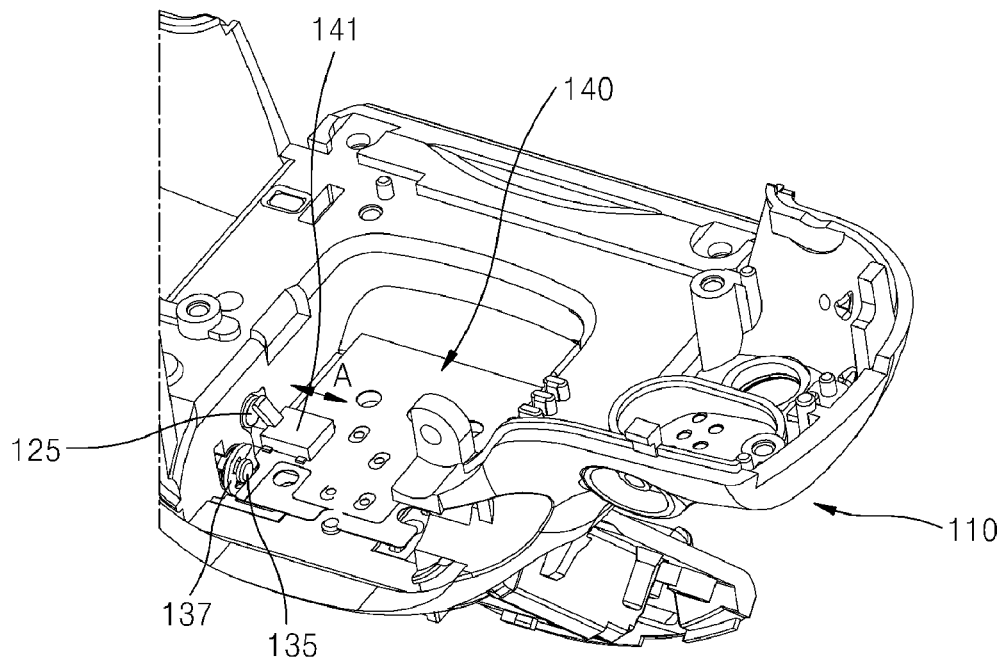
FIG. 12 is a partial rear perspective view of a strobo assembly of FIG. 11 in a closed position according to an embodiment.

Referring to FIGS. 9 and 12, when the strobo assembly 120 is closed, the stopper 125 can contact the detection member 141, and thus the detection member 141 can recognize its contact with the stopper 125. The detection member 141 can then inhibit emitting of the light source 123 of the strobo assembly 120.

Figure 13:
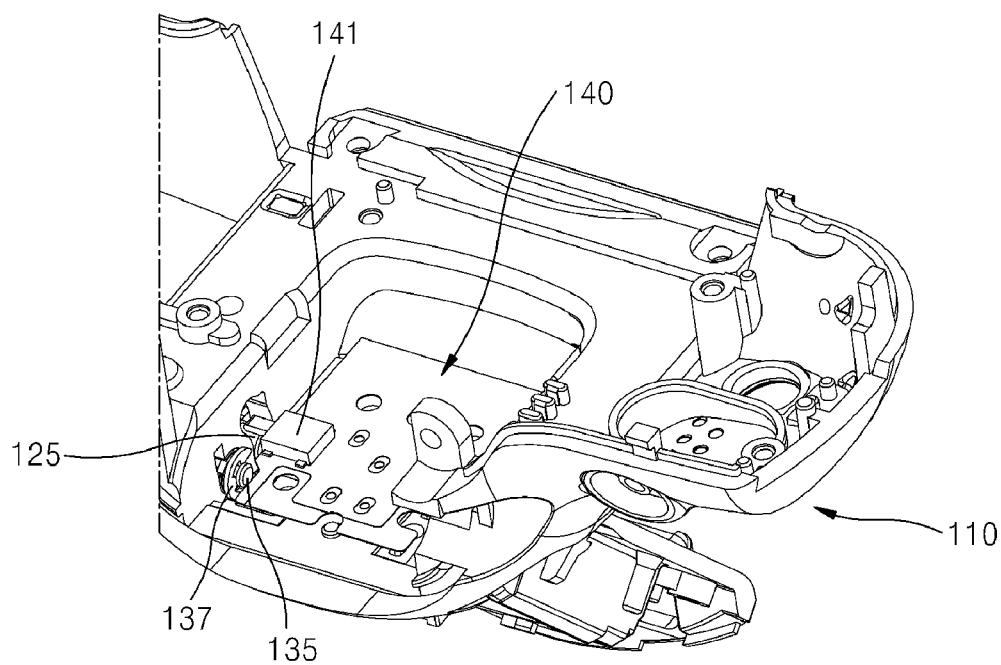
FIG. 13 is a partial rear perspective view of a strobo assembly of FIG. 11 in an open position according to an embodiment.

Referring to FIGS. 10 and 13, when the strobo assembly 120 is opened, the stopper 125 can move in a direction to which the strobo assembly 120 is opened. The stopper 125 and the detection member 141 may no longer contact each other. The detection member 141 can then release a signal applied by the stopper 125, and the light source 123 of the strobo assembly 120 can then emit light.

Furthermore, the detection member 141 can move to some degree in at least one of the directions shown by an arrow referenced with an "A" in FIG. 12, thereby establishing an adjustable light emitting recognition angle.

When the detection member 141 moves to some degree in a left direction of the arrow "A" in FIG. 12, the detection member 141 and the stopper 125 can be closer to each other, and thus a small movement of the stopper 125 determines whether the detection member 141 and the stopper 125 contact each other. When the detection member 141 moves to some degree in a right direction of the arrow "A" in FIG. 12, the detection member 141 and the stopper 125 can be farther apart from each other, and thus a relatively larger movement of the stopper 125 determines whether the detection member 141 and the stopper 125 contact each other. That is, the light emitting recognition angle of the detection member 141 can be freely changed by adjusting a space between the detection member 141 and the stopper 125.

Accordingly, a strobo light emitting signal can be recognized without additional mechanism parts, thereby simplifying a structure used to control light emitting of a strobo assembly and accordingly improving assembly and production of an apparatus including the strobo assembly. Furthermore, the light emitting recognition angle of the detection member 141 can be easily adjusted.

According to the present invention, a strobo assembly has a simpler and smaller structure, and the light emitting angle of a strobo can be controlled.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation on the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc., such as the FPCB assembly 140, shown in FIG. 11. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implement using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein can be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical." It will also be recognized that the terms "comprises," "comprising," "includes," "including," "has," and "having," as used herein, are specifically intended to be read as open-ended terms of art. The use of the terms "a" and "an" and "the" and similar references in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An imaging apparatus comprising:
   a case; and
   a strobo assembly coupled to the case and that revolves with respect to the case,
   wherein the strobo assembly comprises:
      a light source that emits light;
      a strobo housing that accommodates the light source;
      a bush embedded in the strobo housing and that provides a revolution shaft of the strobo assembly; and
      an elastic member accommodated in the bush and that provides a predetermined elastic force so that the strobo assembly revolves with respect to the case.

2. The imaging apparatus of claim 1, wherein the strobo housing has a shape approximately corresponding to a "U", and the bush and the elastic member are inserted into one end portion of the shape approximately corresponding to the "U".

3. The imaging apparatus of claim 2, wherein a protrusion portion is formed on the one end portion of the strobo housing, and one end portion of the elastic member is caught by the protrusion portion.

4. The imaging apparatus of claim 3, wherein the elastic member is a coil spring having one end portion that protrudes and forms a hooking portion.

5. The imaging apparatus of claim 4, wherein the hooking portion is hooked by the protrusion portion.

6. The imaging apparatus of claim 1, wherein a shaft is inserted into one end portion of the bush, and a shaft holder is inserted into an end portion of the shaft that protrudes toward another end portion of the bush.

7. The imaging apparatus of claim 1, wherein the bush and the elastic member accommodated in the bush are inserted into the case and the strobo housing.

8. The imaging apparatus of claim 1, further comprising:
   a stopper formed in one end portion of the elastic member; and
   a detection member disposed on a flexible printed circuit board (FPCB) assembly that is coupled an the inside of the case.

9. The imaging apparatus of claim 8, wherein the stopper and the detection member are formed to contact to each other.

10. The imaging apparatus of claim 9, wherein, when the stopper and the detection member contact each other, light emitting of the light source is restricted.

11. The imaging apparatus of claim 9, wherein, when the stopper and the detection member are separated from each other, the light source is allowed to emit light.

12. The imaging apparatus of claim 8, wherein a revolution angle of the strobo assembly with respect to the case determines whether the stopper and the detection member contact each other.

13. The imaging apparatus of claim 12, wherein the stopper and the detection member contact each other when at least a portion of the strobo assembly is positioned inside the case.

14. The imaging apparatus of claim 12, wherein the stopper and the detection member are separated from each other when at least a portion of the strobo assembly is positioned outside the case.

15. The imaging apparatus of claim 8, wherein a space between the stopper and the detection member is adjustable.

16. The imaging apparatus of claim 1, wherein the bush and the elastic member are intergrally formed.

* * * * *